(12) United States Patent
Trinks et al.

(10) Patent No.: US 11,673,823 B2
(45) Date of Patent: Jun. 13, 2023

(54) GLASS TUBE ELEMENT WITH IMPROVED QUALITY

(71) Applicant: SCHOTT AG, Mainz (DE)

(72) Inventors: Volker Trinks, Mitterteich (DE); André Witzmann, Waldershof (DE)

(73) Assignee: SCHOTT AG, Mainz (DE)

( * ) Notice: Subject to any disclaimer, the term of this patent is extended or adjusted under 35 U.S.C. 154(b) by 153 days.

(21) Appl. No.: 17/221,530

(22) Filed: Apr. 2, 2021

(65) Prior Publication Data
US 2021/0309555 A1    Oct. 7, 2021

(30) Foreign Application Priority Data
Apr. 3, 2020 (EP) .................... 20168087

(51) Int. Cl.
| | | |
|---|---|---|
| C03B 17/04 | (2006.01) | |
| C03C 3/078 | (2006.01) | |
| C03C 3/083 | (2006.01) | |
| C03C 3/085 | (2006.01) | |
| C03C 3/087 | (2006.01) | |
| C03C 3/089 | (2006.01) | |
| C03C 3/091 | (2006.01) | |
| C03C 3/093 | (2006.01) | |
| C03C 3/095 | (2006.01) | |
| C03C 3/097 | (2006.01) | |
| C03C 21/00 | (2006.01) | |

(52) U.S. Cl.
CPC .............. *C03B 17/04* (2013.01); *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 3/095* (2013.01); *C03C 3/097* (2013.01); *C03C 21/002* (2013.01)

(58) Field of Classification Search
CPC ...................................... C03B 17/04
See application file for complete search history.

(56) References Cited

U.S. PATENT DOCUMENTS

2005/0076675 A1    4/2005    Bogdahn

FOREIGN PATENT DOCUMENTS

| DE | 1596576 | 3/1971 |
| DE | 19960210 | 7/2001 |
| WO | 03022757 | 3/2003 |

OTHER PUBLICATIONS

DIN ISO 7991:1987.

*Primary Examiner* — Michael C Miggins
(74) *Attorney, Agent, or Firm* — Ruggiero McAllister & McMahon LLC

(57) ABSTRACT

A glass tube element having a hollow cylindrical section with a shell having an outer diameter is provided. A first ratio is a difference value to a mean value. The difference value is a difference of a minimal and maximal value of the outer diameter. The mean value is a mean of the minimal and maximal values. A sub-section having a start, an end, and a distance of 1 meter measured along a straight line from the start to the end and intersecting with a center axis of the sub-section at the start and the end. The sub-section having, for every point of the center axis, a shortest distance to the straight line. A second ratio of a specific distance to 1 meter, the specific distance being defined as a largest of all shortest distances. A product of the first and second ratio is smaller than $4\times10^{-6}$.

19 Claims, 5 Drawing Sheets

GLASS TUBE ELEMENT WITH IMPROVED QUALITY

CROSS REFERENCE TO RELATED APPLICATIONS

This application claims benefit under 35 USC § 119 of European Application 20168087.3 filed Apr. 3, 2020, the entire contents of which are incorporated herein by reference.

BACKGROUND

1. Field of the Invention

The present invention relates to a glass tube element, a use for such a glass tube element and a method for producing such a glass tube element.

2. Description of Related Art

Glass tube elements are widely used as basic parts in many different industries. One reason for that is that glass tube elements have the advantage that they can at least in part be reshaped in a subsequent processing chain easily and with convenient means in many different ways. A plurality of different products can be produced from just a few different glass tube elements as basic parts. This allows providing a flexible and wide product range at manageable costs and with widely available technical means.

Especially in the field of pharmaceutical containers glass tube elements are of particular interest as basic parts for vials, syringes or the like. Furthermore, glass can be made such that it is free of toxic ingredients like Pb, As, and Cd, has high chemical stability and also high chemical inertness. Because of the high chemical stability of the glass the precipitation or leaking out of substances of the glass wall (or shell) of the glass tube element can be eliminated or at least reduced, which particularly indicates great suitability for the pharmaceutical domain.

Along with the high degree of freedom concerning design options, it is apparent that glass tube elements come along with advantageous properties for being used as basic parts for pharmaceutical containers in combination with pharmaceutical compositions.

However, the demands placed on pharmaceutical containers are high. And so are the demands placed on glass tube elements. For fulfilling respective specifications, it is especially required that also the respective basic parts have a uniform design, hence, geometric parameters within strict boundaries. This way it can be ensured that a product such as a syringe made on basis of a glass tube element is free of unintended tensions per se and has no miss-matches with respect to other parts such as caps or the like to which it should be connected to later. This allows a safe interaction of the product with other parts and a safe handling of the product in general.

Otherwise, critical situations either in the production process or during use may arise. A destruction of the product, e.g., a pharmaceutical container, might happen. Thus, the loss of the pharmaceutical composition held by the container and, in addition, risks for persons handling with the pharmaceutical container might be the result.

Therefore, quality requirements placed on pharmaceutical container are likewise also placed on the basic parts in form of glass tube elements. So far, there have been identified a large variety of geometric parameters of the glass tube elements which can be made subject to optimization in order to achieve glass tube elements of high quality.

However, the demands on the quality are continuously increasing. It is, therefore, necessary to further improve the quality of the pharmaceutical containers, hence, the quality of the glass tube elements.

SUMMARY

It is, thus, the object of the present invention to provide glass tube elements of improved quality, which are particularly suitable for use as basic parts for further processing such as reshaping according to the needs in the pharmaceutical industry. It is also an object of the present invention to provide a use for such a glass tube element and a method for producing such a glass tube element.

The problem is solved by the invention according to a first aspect in that a glass tube element comprising: at least one section which is of hollow cylindrical form, wherein the section has at least one shell which encloses at least one lumen; wherein a first ratio of (A) the difference value of the minimal and the maximal value of the outer diameter of the shell in a specific cross-sectional plane of the glass tube element and (B) the mean value of the minimal and maximal value of the outer diameter of the shell in the specific cross-sectional plane of the glass tube element is defined, with the specific cross-sectional plane being one of the one or more cross-sectional planes which is or are perpendicular to the direction of the main extension of the glass tube element and in which plane or planes the difference of the minimal and maximal outer diameter of the shell has the largest absolute value; wherein at least one sub-section of the section of the glass tube element is or can be selected, the sub-section of the section of the glass tube element having at least one start and at least one end, a distance of 1 meter is or can be measured along a straight line from the start to the end, intersecting with the center axis of the sub section of the section of the glass tube element at the start and the end; wherein for every point of the center axis of the sub-section of the section of the glass tube element a shortest distance to the straight line is or can be identified; wherein a second ratio of (C) a specific distance and (D) 1 meter is defined, with the specific distance being defined as the largest of all shortest distances; wherein the product of the first and second ratio is smaller than $4 \times 10^{-6}$ is proposed.

The invention is, thus, based on the surprising finding that glass tube elements have improved quality and, thus, are particular suitable for subsequent processing such as at least partly reshaping if geometric parameters of the glass tube elements are not (only) considered in isolation but in an appropriate relation to each other. According to the invention this can be particularly achieved by defining respective properties and dependencies and assigning appropriate boundaries to one or more of them.

It has been particularly found by the inventors that selecting properties which describe the design of the glass tube element mainly in planes perpendicular to each other lead to glass tube elements of high quality. In other words, it has been found to be advantageous to use such properties which are largely unrelated with each other. In this way a full three dimensional coverage of the glass tube element's design aspects is possible with at the same time the need for only considering a few properties.

In this regard a property in form of the first ratio describes the design of the glass tube element in a first plane perpendicular to the main direction of extension of the glass tube element in terms of its ovality. And another property in form of a second ratio describes the design of the glass tube element in a second plane parallel to the main direction of extension of the glass tube element in terms of its straightness.

Thus, the inventors surprisingly found that appropriate properties are the ovality and the straightness of the glass tube element which, when selected in an appropriate manner, result in an improved glass tube element with respect to quality and durability.

According to the inventive concept, the elements of both properties are further linked with each other by means of a dependency in terms of a figure of merit which is limited by some boundary. This variable—so to say—entangles the beforehand largely uncorrelated single properties ovality and straightness of the glass tube element with each other. Or in other words, two spatial directions perpendicular on each other are connected in that way. It turned out that the definition of a dependency or, in other words, a combined property, allows to control the quality of a glass tube element in a global manner.

This allows a surprisingly reliable and cheap way to obtain a glass tube element of high quality, hence, high quality products such as pharmaceutical containers based on such glass tube elements can be obtained.

It is appreciated that there can be more than one plane which is perpendicular to the direction of the main extension of the glass tube element and in which planes the difference has the (same) largest value.

It is appreciated that in preferred embodiments the direction of the main extension of the glass tube element is one of at least two possible directions.

It is acknowledged that the terms "shell (of the cylinder/glass tube element)" and "wall (of the cylinder/glass tube element)" are used as synonyms here.

In one embodiment it might alternatively or in addition be preferred that the first ratio is smaller than 0.005, preferably smaller than 0.0045, more preferably smaller than 0.004, more preferably smaller than 0.0035, more preferably smaller than 0.003, more preferably smaller than 0.0025, even more preferably smaller than 0.002, and most preferably smaller than 0.001.

By limiting one (or more) properties (i.e., ratios) to certain ranges of values, a design of the glass tube element is achieved which has been proven to represent a particular useful basic part of high quality. This is true, because not only a global control parameter in form of the dependency is specified but also a property which contributes to the global control parameter.

A smaller ratio allows to improve the reliability and the quality of the glass tube element, hence, the final products. This in turn allows also to produce components which provide even better interconnection functionality with reduced play.

In one embodiment it might alternatively or in addition be preferred that the second ratio is smaller than 0.00075, more preferably smaller than 0.0007, more preferably smaller than 0.00065, more preferably smaller than 0.0006, more preferably smaller than 0.0005, more preferably smaller than 0.0004, more preferably smaller than 0.0003, even more preferably smaller than 0.00025, and most preferably smaller than 0.0002.

By limiting one (or more) properties (i.e., ratios) to certain ranges of values, a design of the glass tube element is achieved which has been proven to represent a particularly useful basic part of high quality. This is true, because not only a global control parameter in form of the dependency is specified but also a property which contributes to the global control parameter.

A smaller ratio allows to improve the reliability and the quality of the glass tube element, hence, the final products. This in turn allows production of components which provide even better interconnection functionality with reduced play.

While already a significant improvement can be obtained by fulfilling only a single ratio (property), a further improved design is obtained by fulfilling even two ratios (properties) in preferred embodiments.

In one embodiment it might alternatively or in addition be preferred that the product of the first and second ratio is smaller than $3.5 \times 10^{-6}$, preferably smaller than $3.25 \times 10^{-6}$, more preferably smaller than $3.0 \times 10^{-6}$, more preferably smaller than $2.75 \times 10^{-6}$, more preferably smaller than $2.5 \times 10^{-6}$, more preferably smaller than $2.0 \times 10^{-6}$, more preferably smaller than $1.5 \times 10^{-6}$, even more preferably smaller than $1.0 \times 10^{-6}$, and most preferably smaller than $0.5 \times 10^{-6}$.

A smaller value allows to improve the reliability and the quality of the glass tube element, hence, the final products. This in turn allows also to produce components which provide even better interconnection functionality with reduced play.

In one embodiment it might alternatively or in addition be preferred that the glass tube element has a length of between 0.5 and 5 m, preferably of between 0.7 and 3 m, more preferably of between 1 and 2 m, even more preferably between 1.2 and 1.8 m and most preferably of 1.5 m.

A glass tube element which has a length in the preferred range has an improved quality. This is because a more stable and more defined glass tube element is obtained.

In one embodiment it might alternatively or in addition be preferred that the maximal outer diameter is between 1 and 100 mm, preferably between 3 and 60 mm, more preferably of between 6 and 45 mm, 8 and 19 mm, 6 and 50 mm or 8 and 30 mm.

A glass tube element which has a maximal outer diameter in the preferred range has an improved quality. This is because a more stable and more defined glass tube element is obtained.

In one embodiment it might alternatively or in addition be preferred that the shell has an average thickness of between 0.1 and 5 mm, preferably between 0.2 and 3 mm, more preferably of between 0.3 and 2.5 mm, most preferably between 0.4 and 1.8 mm.

A glass tube element which has a preferred average thickness of the shell is particularly suitable for applying the inventive approach because an even more reliable first and second ratio can be obtained for such glass tube elements.

The term "average thickness" means here the average thickness of the shell across the length of the glass tube element. If the thickness of the shell has everywhere a constant value, the average thickness is identical to the actual thickness.

In one embodiment it might alternatively or in addition be preferred that the glass tube element comprises at least in part silicate glass, such as soda line and/or alumosilicate glass, and/or borosilicate glass.

In one embodiment it might alternatively or in addition be preferred that the glass tube element, especially its glass material, has a transition temperature which is higher than 300 degrees C., preferably higher than 500 degrees C., more preferably higher than 520 degrees C., even more preferably higher than 530 degrees C., even more preferably higher than 550 degrees C., and most preferably higher than 600 degrees C. and/or lower than 900 degrees C., preferably lower than 800 degrees C., more preferably lower than 700 degrees C., even more preferably lower than 650 degrees C., and most preferably lower than 630 degrees C.

Preferably the transition temperature refers to the transition temperature of the glass used for the wall of the glass tube element.

In one embodiment it might alternatively or in addition be preferred that the glass tube element, preferably during its production process, is at least temporarily connected to one or more further glass tube elements, preferably in one piece, and/or is part of at least one glass tube line.

It is more economic to manufacture a longer or even an endless glass tube line with subsequent confectioning of individual glass tube elements from that line with a desired length.

In one embodiment it might alternatively or in addition be preferred that the glass tube element has an average linear coefficient of thermal expansion measured in the range of 20 degrees C. to 300 degrees C. (CTE) between 3.0 and $10.0*10$ $K^{-1}$, preferably between 3.3 and $7.5*10$ $K^{-1}$, more preferably between 4.7 and $6.0*10^{-6}$ $K^{-1}$.

It is beneficial for the glass tube to have a lower CTE, which leads to a more uniform product. Hence, in preferred embodiments, the CTE is limited to no more than $6.9*10^{-6}$ $K^{-1}$ or no more than $5.9*10^{-6}$ $K^{-1}$. The CTE may be measured according to DIN ISO 7991:1987.

In one embodiment it might alternatively or in addition be preferred that the glass tube element, preferably during its production process, at least during at least one part of its period of cooling passes with a defined speed of movement along a defined path of movement, preferably the path of movement extends parallel to the direction of the main extension of the glass tube element and/or in a horizontal direction, through at least one cooling device, for setting up a locally modified cooling rate of the glass tube element.

It has been surprisingly found that the geometric parameters, hence, each of the first and second ratio and the overall quality of the glass tube element can be improved, if the glass tube element undergoes a special treatment during its period of cooling. It has been proven to lead to advantageous results if the process of cooling is influenced by changing the cooling rate of the glass tube element locally.

Preferably the cooling rate of the outer surface of the glass tube element is modified. However also modifications to the cooling rate elsewhere such as within the shell of the glass tube element might be applied.

If the speed of movement and the path of movement is defined, a higher control of the cooling process can be obtained. Particularly a path of movement which is straight or at least nearly straight has been found as being preferred for a uniform and reproducible interaction.

The inventors assume that applying the mentioned treatment using the cooling device as well as the other settings, respectively, during the cooling process lead to a manipulation of the structure, especially the structure on, beneath and/or near the outer surface, of the glass tube element which in turn lead to improved geometric properties of the same.

In one embodiment it might alternatively or in addition be preferred that the speed of movement is between 1 and 1000 cm/s, preferably between 20 and 800 cm/s, more preferably between 30 and 500 cm/s and most preferably 100 cm/s.

For preferred speeds an optimal interaction time between the cooling device and the glass tube element is obtained. Hence, a glass tube element of improved quality is obtained as well.

In one embodiment it might alternatively or in addition be preferred that the glass tube element has at least temporarily a surface temperature of between Tg−50 and Tg+150 degrees C. while passing through and/or along the cooling device.

The inventors have found that a glass tube element which has a surface temperature (especially the temperature of the outer surface of the shell) which is within a certain interval around the transition temperature of the material (i.e., glass) of the glass tube element, a particular beneficial interaction between the cooling device and the glass tube element can be obtained. The result is a glass tube element of improved quality.

The inventors assume that for a temperature range around the transition temperature, the glass tube element can be affected by the inventive concept in an advantageous manner compared to other temperatures because the cooling device can so to say "imprint" a modification which lead to improved properties of the glass tube element.

In preferred embodiments the surface temperature is the temperature at the outer surface.

It is acknowledged that the glass tube element has a surface temperature within the preferred temperature interval at least temporarily while passing through/along the cooling device. In other words, it is required in the preferred embodiments that the surface temperature of the glass tube element is at least for some time within the preferred temperature interval while passing through/along the cooling device.

This does not exclude that the surface temperature is, e.g., at the beginning of passing through/along the cooling device, above the upper limit and/or that the surface temperature is, e.g., at the end of passing through/along the cooling device, below the lower limit.

In one embodiment it might alternatively or in addition be preferred that the cooling device has at least one contacting device, wherein the contacting device has at least from time to time and/or area by area, preferably direct, contact with at least one area of the outer surface of the glass tube element.

It is the astonish finding that providing a contacting device allows controlling the locally existing cooling rate on the surface, respectively of the outer surface, of the glass tube element in a precise, reliable and comfortable manner. It is also possible to control the instance of time when it contacts the glass tube element. This might be controlled for example by a respective spatial placement of the contacting device within the cooling device, such that the glass tube element passes at an earlier or later instant of time along the respective contacting device. Of course, preferably not the entire contacting device must be in contact with the glass tube element, but it may. Also a part thereof might be sufficient. Of course, not the entire outer surface of the glass tube element must have contact with the contacting device, but it may. Also an area of the outer surface of the glass tube element might be sufficient.

These design parameters allow to efficiently control the degree of interaction between the contacting device and the glass tube element. The earlier, the longer and the more widely the contact between the contacting device and the glass tube element is, the more interaction between both might take place, hence, the more cooling might take place.

In further preferred embodiments the cooling device has alternatively or in addition at least one fluid dispenser device which is designed to provide a fluid, such as water, fog and/or air, preferably compressed air, preferably at least from time to time and/or area by area, on at least one area of the outer surface of the glass tube element.

Using a fluid allows an improved control of the cooling process of the glass tube element. Especially a high change of the temperature within short time can be achieved that way. This might also be used for supporting the cooling process carried out by the contacting device.

Preferably the fluid dispenser is designed at least in part in form of at least one ring nozzle. This allows that a homogeneous (and circumferential) interaction between the fluid and the glass tube element is achieved. In other words, using ring nozzles allows to cover the complete outer surface of the glass tube element. It has been proven that this lead to an improved straightness of the glass tube element at least in sections.

In also preferred embodiments the fluid dispenser is used as part of at least one air bearing and/or in combination with at least one contacting device. This allows to obtain an interaction with reduced or even without directly contacting the glass tube element with the contacting device. This may reduce contamination effects.

In one embodiment it might alternatively or in addition be preferred that the cooling device has a plurality of contacting devices, wherein preferably a first number of the plurality of contacting devices comes in contact with the outer surface of the glass tube element one after another in time and/or at different areas of the outer surface and/or a second number of the plurality of contacting devices comes in contact with the outer surface of the glass tube element at the same time and/or at different areas of the outer surface.

Using more than one contacting device allows a more efficient interaction between the cooling device and the glass tube element and, thus, a further improvement of the properties of the glass tube element.

If some or all of the contacting devices sequentially (spatially and/or in time) come in contact with the outer surface of the glass tube element (wherein the contacting devices do not necessarily all have to contact the same areas of the outer surface of the glass tube element but at least some or all contacting devices may contact different areas of the outer surface of the glass tube element) a graded interaction might be obtained because for example the contact occurs at different temperatures of the outer surface and/or with different interaction devices.

If some or all of the contacting devices (which are for example spatially distributed) come in contact with the outer surface of the glass tube element (but e.g., at different areas thereof) at the same time the interaction between the contacting devices and the glass tube element can take place within a small physical volume, hence, the cooling device can be of only reduced size. This is beneficial from an economic point of view.

In one embodiment it might alternatively or in addition be preferred that two contacting devices, preferably each of two contacting devices, respectively of the plurality of contacting devices, which are arranged down along the path of movement in a consecutive manner have a center-center-distance, preferably measured along the path of movement, of 50 cm or less, more preferably of 40 cm or less, even more preferably of 30 cm or less, even more preferably of 20 cm or less, and most preferably of 10 cm or less.

It has proven advantageous to allow different distances between adjacent contacting devices down the path of movement. In addition the distances between adjacent contacting devices may vary. Preferably the distance is reduced. This may lead to an increased number of subsequent interactions during higher surface temperatures, which might have more impact on the properties of the glass tube element than interactions at lower surface temperatures. This also allows interaction with the glass tube element within a shorter period of time.

It has been proven to be advantageous to apply such an increased interaction, even if it comes on cost of a larger setup. The resulting glass tube elements have improved geometric parameters, especially improved first and second ratios, hence improved quality.

In preferred embodiments the center-center distance between adjacent contacting devices is small or even very small, especially compared to the length of the glass tube element.

In preferred embodiments the center-center distance between adjacent contacting devices is small or even very small and in addition the glass tube element is rotated while passing the cooling device (especially the contacting device(s)). It has been proven to lead to an improved straightness if many contacting devices are contacting the glass tube element within the cooling device. Especially if the glass tube element (or the outer surface thereof) has a temperature of around Tg while being contacted an improved straightness can be observed.

In one embodiment it might alternatively or in addition be preferred that at least one of, more than one of, or all of the contacting devices each has, preferably at the same time, contact with two, three, four or more than four areas of the outer surface of the glass tube element by respective contacting areas of the contacting device, wherein preferably the contacting areas and/or the areas of the outer surface contacted by each contacting device are separated from each other.

If the contacting device is designed such that a plurality of parts of the contacting device interact (e.g., contact) with the glass tube element, especially at the outer surface, an improved, more efficient, more comprehensive and faster control of the cooling process can be obtained.

In one embodiment it might alternatively or in addition be preferred that at least a third number, preferably two, three, four or five, of the plurality of contacting devices form a contacting device group, wherein the contacting devices of the contacting device group are arranged, preferably in a rotationally symmetrical manner, around the glass tube element, preferably at least some or all of the third number of contacting devices get in contact with the glass tube element at the same time, at different areas of the outer surface of the glass tube element and/or from different spatial directions.

With appropriate spatial arrangement of the contacting devices a manipulation of the cooling process can be accomplished in a fast and reliable manner. This is true because two or even more contacting devices can get in contact with the glass tube element at the same time and/or from different spatial directions. It has also been proven to have advantageous effects on the properties of the glass tube element if respective arrangements are employed.

In one embodiment it might alternatively or in addition be preferred that the cooling device, especially the contacting device(s), brings the surface temperature of the glass tube element to Tg−200 degrees C. or lower after passing through and/or along the cooling device; and/or wherein at least one or all contacting device(s) has or have, at least in the area where the glass tube element is contacted, especially in the area of the contacting areas, a thermal conductivity of between 1 and 100 W/(m*K), preferably of between 10 and 70 W/(m*K), most preferably of between 30 and 50 W/(m*K).

By employing a design of the contacting devices with defined thermal conductivity a precise control of the cooling process can be obtained. This allows to improve the quality of the glass tube element.

In one embodiment it might alternatively or in addition be preferred that at least one of or all of the contacting devices is or are designed as at least one castor, wherein preferably the glass tube element is moveable, supportable, moved and/or supported along the movement path by means of the castor.

Employing castors allows to have a great design freedom and flexibility. For example different sizes, especially different diameters, different materials, different thermal conductivities and different contacting areas can be achieved with less effort.

For example in at least one cross-sectional plane of the castor, preferably the plane comprising the center axis of the castor, the castor has at least partially at least one V-like recess.

This recess allows to realize two contacting areas between the castor and the glass tube element at the same time. In other words, within the space provided by the "V" the glass tube element can be supported by the castor, hence, the castor provides two side walls which might contact the glass tube element.

A castor further allows to be utilized as a transport means for moving the glass tube element at the same time. This is very economic.

It is acknowledged that one or more castors can also be replaced by a respective number of rolls.

In one embodiment it might be alternatively or in addition preferred that at least one contacting device, especially one or more castors, is temperature-regulated, especially cooled.

This allows to precisely control the temperature difference between the contacting device and the glass material.

In one embodiment it might alternatively or in addition be preferred that each castor has at least one contacting area contacting the glass tube element, which contacting area has at least one point which has a distance of 10 cm or less, of 5 cm or less, of 3 cm or less, of 1 cm or less, or of 0.5 cm or less, respectively, from the center axis of the castor.

It has been proven being advantageous if the contact area of the castor is close to the center axis of the castor. This allows that the size of the castor can be limited with an upper value which in turn lead to compact setups and in addition also yields optimal interaction results.

In one embodiment it might alternatively or in addition be preferred that each castor has an outer diameter of 50 cm or less, preferably of 30 cm or less, more preferably of 15 cm or less, even more preferably of 10 cm or less, even more preferably of 5 cm or less, even more preferably of 3 cm or less, and most preferably of 1 cm or less.

It has been proven being advantageous if the size of the castor is limited with an upper value which in turn lead to compact setups and in addition also yields optimal interaction results. The smaller the individual castor is the more castors can be used within small spaces and the more castors can be arranged one after the other. This allows high interaction results.

In one embodiment it might alternatively or in addition be preferred that at least one of or all of the contacting devices is or are designed as at least one chain and/or at least one belt, wherein preferably the glass tube element is moveable, supportable, supported and/or moved along the movement path by means of the chain or the belt.

A chain or a belt allow special contacting geometries for controlling the cooling process.

A chain or a belt further allows to be utilized as a transport means for moving the glass tube element at the same time. This is very economic.

In one embodiment it might alternatively or in addition be preferred that the plurality of contacting devices can be grouped into at least two groups with respect to at least one aspect of the contacting devices such as quantity, diameter, size, spatial location, center-center-distance, thermal conductivity and/or design, especially castor design, belt design or chain design, wherein preferably for each group the value(s) for the respective aspects each is (are) individually selected from the corresponding options as mentioned hereinabove.

If different types of contacting devices are used, the interaction between the cooling device and the glass tube element can be tailored to the specific requirements.

For example for a plurality of contacting devices (e.g., 5 contacting devices) a first group A of contacting devices (e.g., 2 contacting devices) has contacting devices of design A1 (e.g., castor), diameter A2 (e.g., 5 cm), center-center-distance A3 (e.g., 6 cm), spatial location A4 (e.g., centers at 0 cm and 6 cm measured from some reference point) and thermal conductivity A5 (e.g., 30 W/(m*K)). A second group B of contacting devices (e.g., 3 contacting devices) has contacting devices of design B1 (e.g., castor, too), diameter B2 (e.g., 2 cm), center-center-distance B3 (e.g., 3 cm), spatial location B4 (e.g., centers at 10 cm, 13 cm and 16 cm measured, respectively, from the reference point) and thermal conductivity B5 (e.g., 40 W/(m*K)).

In other words, using for each group all possible combinations of parameters allows an improved manufacturing process, hence, improved properties of the glass tube element.

In one embodiment it might alternatively or in addition be preferred that the glass tube element is rotated at least during its period of cooling, preferably (i) dependent on the speed of movement, (ii) with a rotation speed of 1 round or more per second, preferably 5 rounds per second or more and/or (iii) with 0.5 or more, preferably with 1 or more, 3 or more, 5 or more or 10 or more, rotations during it is passed through the cooling device.

Rotating the glass tube element allows to achieve an interaction between the contacting device and the glass tube element around the complete circumference of the glass tube element. Especially, rotating allows a circumferential interaction with only one single contacting device while, of course, also more than one contacting device might be used. This allows to improve the properties of the glass tube element.

If one or more rotations during the time while the glass tube element is passed through the cooling device is conducted, it can be ensured that indeed at least one complete 360 degree interaction has been carried out for the glass tube element.

However, it has been found that in certain situations it might be alternatively or in addition preferred that there is no rotation at all.

The problem is solved by the invention according to a second aspect in that a glass tube element, especially according to the first aspect of the invention, for use as at least one basic part for at least one pharmaceutical container such as a vial, cartridge, ampoule or syringe is proposed.

It has been surprisingly found that due to the improved properties, a glass tube element according to the inventive concept is predestined for pharmaceutical containers.

Thus, a glass tube element can be very useful in the manufacturing process of a pharmaceutical container. For example it can be used in the manufacturing process of vials or syringes.

The problem is solved by the invention according to a third aspect in that a method for producing a glass tube element, especially according to the first aspect of the invention, comprising the steps of: Providing a glass tube line; Guiding the glass tube line during its period of cooling with a defined speed of movement along a defined, preferably horizontally extending, path of movement, wherein along at least one section of the path of movement at least one cooling device is provided, with the glass tube line having at least temporarily a surface temperature of between Tg−50 and Tg+150 degrees C. while passing through and/or along the cooling device; Acting at least temporarily and/or area by area by means of the cooling device on at least one part of the glass tube line passing through or along the cooling device for setting up a locally modified cooling rate of the glass tube line, preferably such that on the shell of the glass tube line different areas are built, with at least one first area having stress values that are in a first range and at least one second area having stress values that are in a second range; and Confectioning of glass tube elements from the glass tube line is proposed.

It has been surprisingly found that the geometric parameters, hence, each of the first and second ratio and the overall quality of the glass tube element can be improved, if the glass tube line undergoes a special treatment during its period of cooling. It has been proven to lead to advantageous results if the process of cooling is influenced by changing the cooling rate of the glass tube line locally.

Preferably the cooling rate of the outer surface of the glass tube line is modified. However, also modifications to the cooling rate elsewhere such as within the shell of the glass tube line might be applied.

If the speed of movement and the path of movement is defined, a higher control of the cooling process can be obtained. Particularly a path of movement which is straight or at least nearly straight has been found as being preferred for a uniform and reproducible interaction.

The inventors assume that applying the mentioned treatment using the cooling device as well as the other settings, respectively, during the cooling process lead to a manipulation of the structure, especially the structure on, beneath and/or near the outer surface, of the glass tube line which in turn lead to improved geometric properties of the same.

In one embodiment it might alternatively or in addition be preferred that the cooling device has at least one contacting device, wherein the contacting device has at least from time to time and/or area by area, preferably direct, contact with at least one area of the outer surface of the glass tube line.

It is the astonish finding that providing a contacting device allows to control the locally existing cooling rate on the surface, respectively of the outer surface, of the glass tube element in a precise, reliable and comfortable manner. It is also possible to control the instance of time when it contacts the glass tube line. This might be controlled for example by a respective spatial placement of the contacting device within the cooling device, such that the glass tube line passes at an earlier or later instant of time along the respective contacting device. Of course, preferably not the entire contacting device must be in contact with the glass tube line, but it may. Also a part thereof might be sufficient. Of course, not the entire outer surface of the glass tube line must have contact with the contacting device, but it may. Also an area of the outer surface of the glass tube line might be sufficient.

These design parameters allow to efficiently control the degree of interaction between the contacting device and the glass tube line. The earlier, the longer and the wider the contact between the contacting device and the glass tube line is, the more interaction between both might take place, hence, the more cooling might take place.

In further preferred embodiments the cooling device has alternatively or in addition at least one fluid dispenser device which is designed to provide a fluid, such as water, fog and/or air, preferably compressed air, preferably at least from time to time and/or area by area, on at least one area of the outer surface of the glass tube line.

Using a fluid allows an improved control of the cooling process of the glass tube line. Especially a high change of the temperature within short time can be achieved that way. This might also be used for supporting the cooling process carried out by the contacting device.

Preferably the fluid dispenser is designed at least in part in form of at least one ring nozzle. This allows that a homogeneous (and circumferential) interaction between the fluid and the glass tube line is achieved. In other words, using ring nozzles allows to cover the complete outer surface of the glass tube line. It has been proven that this lead to an improved straightness of the glass tube line at least in sections.

In also preferred embodiments the fluid dispenser is used as part of an air bearing and/or in combination with a contacting device. This allows to obtain an interaction with reduced or even without contacting the glass tube line with the contacting device. This may reduce contamination effects.

In one embodiment it might alternatively or in addition be preferred that at least one of or all of the contacting devices is or are designed as at least one castor, wherein preferably the glass tube element is moveable, supportable, moved and/or supported along the movement path by means of the castor.

Employing castors allows to have a great design freedom and flexibility. For example different sizes, especially different diameters, different materials, different thermal conductivities and different contacting areas can be achieved with less effort.

For example in at least one cross-sectional plane of the castor, preferably the plane comprising the center axis of the castor, the castor has at least partially at least one V-like recess.

This recess allows to realize two contacting areas between the castor and the glass tube element at the same time. In other words, within the space provided by the "V" the glass tube element can be supported by the castor, hence, the castor provides two side walls which might contact the glass tube element.

A castor further allows to be utilized as a transport means for moving the glass tube element at the same time. This is very economic.

It is acknowledged that one or more castors can also be replaced by a respective number of rolls.

Thus, the inventive concept clearly demonstrates that by varying the spatial absolute and relative position of, the number of and/or the diameter of the contacting devices, especially the castors, it is possible to obtain different interaction patterns, hence, to achieve an optimization of the interaction between the cooling device and the glass tube element. This interaction in turn has been identified by the inventors to yield high quality glass tube elements. Thus, for different purposes and requirements respective parameters can be chosen in a comfortable way. This in turn allows to modify and improve ovality and straightness of the glass tube element.

Of course, it is also possible to change the speed of movement of the glass tube element in order to change the cooling process, hence, the interaction pattern, hence the modification of the ovality and straightness of the glass tube element, thus, improving quality of the glass tube elements. Likewise, it is also possible to change the speed of rotation of the glass tube element in order to change the cooling process, hence, the interaction pattern, hence the modification of the ovality and straightness of the glass tube element, thus, improving quality of the glass tube elements.

In the following further aspects of the invention are described in detail.

BRIEF DESCRIPTION OF THE FIGURES

Various aspects of this invention will become apparent to those skilled in the art from the following detailed description of preferred embodiments, when read in light of the accompanying schematic drawings, wherein.

DETAILED DESCRIPTION

Figure 1A:
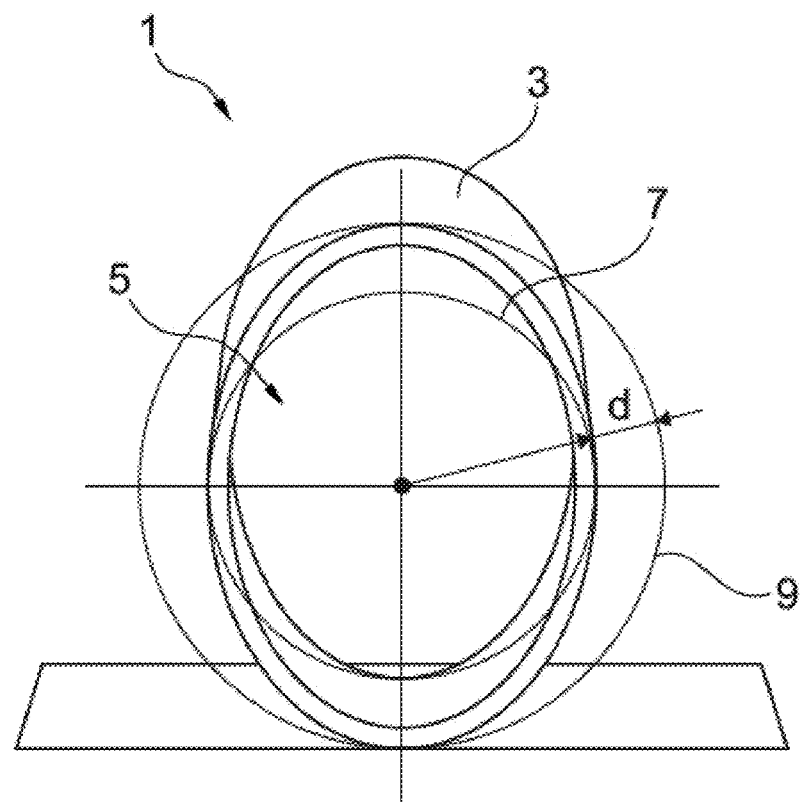
FIG. 1a shows a schematic perspective representation of a glass tube element according to the invention.

FIG. 1a shows a schematic perspective representation of a glass tube element 1 according to the invention.

First Ratio

The glass tube element 1 has a complete hollow cylindrical form (not only a section thereof) and a shell 3 which encloses a lumen 5. In the particular example of FIG. 1a all cross-sectional planes of the glass tube element 1 obtained by means of a plane perpendicular to the direction of the main extension of the glass tube element 1 are identical. Therefore, the plane comprising the end of the glass tube element which is pointing towards the viewer in FIG. 1a can be regarded exemplary as a specific cross-sectional plane of the glass tube element 1 for further explanation.

It is apparent that the outer diameter of the shell 3 varies between a minimal diameter representing a circle 7 and a maximal diameter representing a circle 9 in the specific cross-sectional plane. Both circles 7, 9 are concentric.

For obtaining the first ratio, the absolute value of the difference of the minimal and maximal outer diameter of the shell 3 is needed. The minimal outer diameter of the shell 3 is the diameter of circle 7. The maximal outer diameter of the shell 3 is the diameter of circle 9. The difference is indicated in FIG. 1a as d. Further, the mean value of the minimal and maximal outer diameter of the shell 3 is needed.

It is appreciated that in case of a glass tube element with varying thicknesses and/or geometries of the shell, for each cross-sectional plane a different pair of circles 7, 9 might be obtained. However, according to the definition, for obtaining the first ratio the pair of circles from all cross-sectional planes (being perpendicular to the direction of the extension of the glass tube element 1) is to be used which yield the largest absolute value d.

Second Ratio

The second ratio is based on the specific distance.

Figure 1B:
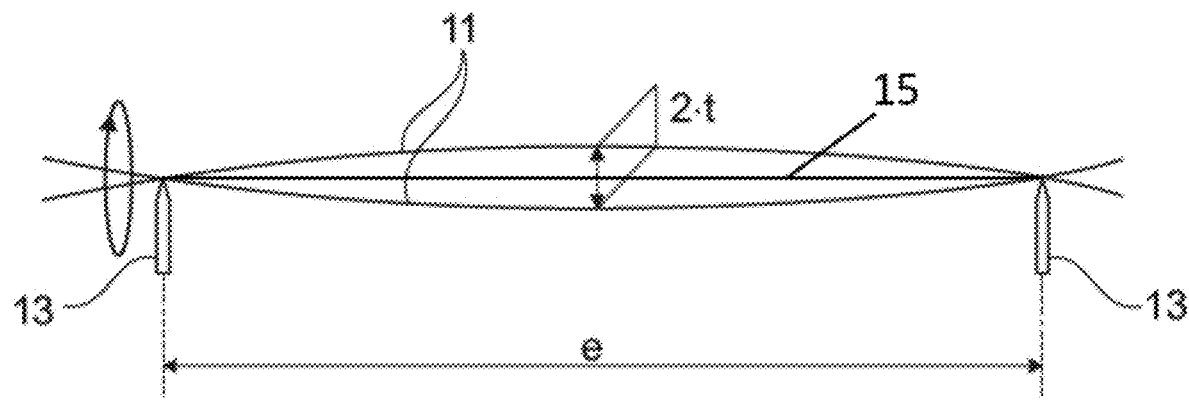
FIG. 1b shows a schematic representation of a setup for obtaining parameters for the second ratio.

FIG. 1b shows a schematic representation of a setup for obtaining parameters for the second ratio. In preferred cases the glass tube element is subject to symmetric bending, i.e., bending which is symmetric between the two ends of the glass tube element. However, in general the bending might not be symmetric.

A class tube element 11 is supported by two supports 13. The distance e between the supports 13 is 1000 mm. Indeed, the distance e is measured along a straight line 15 from the start to the end of some sub-section of the section of the glass tube element 11. Of course if the sub-section of the section of the class tube element extending between the two supports is bended, the true length of that sub-section between the two supports might be longer than the distance of 1 meter between the two supports.

For every point of the center axis of the sub-section of the section of the glass tube element a shortest distance to the straight line 15 is or can be identified. In the illustration of FIG. 1b the glass tube element and its center axis are depicted by the same single line.

Then the class tube element 11 is rotated on the supports 13 (indicated by the arrow in FIG. 1b). FIG. 1b shows the glass tube element 11 in two positions having a difference in the rotation angle of 180 degrees. The sag t of the glass tube element 11 corresponds to the specific distance. This is because the specific distance is the largest of all shortest distances. For the situation shown in FIG. 1b the largest of all shortest distances can be found in the middle between the two supports 13 due to symmetric bending of the glass tube element 11 between the two supports 13.

Here, the sag t corresponds to the specific distance according to the invention.

It is acknowledged that for other types of glass tube elements, other setups might be employed.

The second ratio can then be obtained with said specific distance of the class tube element 11.

Further Glass Properties

The coefficient of linear thermal expansion (CTE) is a measure of characterizing the expansion behavior of a glass when it experiences certain temperature variation. CTE may be the average linear thermal expansion coefficient in a temperature range of from 20° C. to 300° C. as defined in DIN ISO 7991:1987. The lower the CTE, the less expansion with temperature variation. Therefore, in the temperature range of from 20° C. to 300° C. the glass of the wall of the glass tube element of the present invention preferably has a CTE of less than 12 ppm/K, more preferably less than 10.0 ppm/K, more preferably less than 9.0 ppm/K, more preferably less than 8.0 ppm/K, more preferably less than 7 ppm/K, more preferably less than 6.5 ppm/K. However, the CTE should also not be very low. Preferably, in the temperature range of from 20° C. to 300° C. the CTE of the glasses of the present invention is more than 3 ppm/K, more preferably more than 4 ppm/K, more preferably more than 5 ppm/K, more preferably more than 6 ppm/K. In order for the glasses to be well suitable for chemical toughening, the glasses may contain relatively high amounts of alkali metal ions, preferably sodium ions. However, thereby the average linear thermal expansion coefficient CTE in the temperature range between 20° C. and 300° C. is increased. Preferably, the glass of the wall of the glass tube element of the invention has a CTE higher than $7*10^{-6}/°$ C., more preferably higher than $8*10^{-6}/°$ C., more preferably higher than $9*10^{-6}/°$ C. However, a high CTE also complicates production of the glasses by direct hot-forming. Therefore, the glasses preferably have a CTE lower than $13*10^{-6}/°$ C.

The transition temperature of the glass used for the wall of the glass tube element may be higher than 300° C., higher than 500° C., higher than 520° C., higher than 530° C., higher than 550° C., or even higher than 600° C. The transition temperature of the wall of the glass tube element may be lower than 900° C., lower than 800° C., lower than 700° C., lower than 650° C., or lower than 630° C. Generally, a low transition temperature usually includes lower energy costs for melting the glass and for processing. Also, the glass will usually have a lower fictive temperature if the transition temperature is low. Hence, the glass will be less prone to irreversible thermal shrinkage during optional chemical toughening, if the transition temperature is higher.

The glass tube element should be manufactured with a high purity and it should feature a good resistance, especially against alkaline solutions. The resistance against alkaline solutions is important for the use of glass tube elements.

The average surface roughness ($R_a$) is a measure of the texture of a surface. It is quantified by the vertical deviations of a real surface from its ideal form. Commonly amplitude parameters characterize the surface based on the vertical deviations of the roughness profile from the mean line. $R_a$ is arithmetic average of the absolute values of these vertical deviations. The roughness can be measured with atomic force microscopy. The inner surface and/or outer surface of the glass tube element preferably has an average surface roughness Ra of less than 30 nm, of less than 10 nm, of less than 5 nm, of less than 2 nm, of less than 1 nm. In some embodiments, the surface roughness Ra is less than 0.5 nm. A smaller inner and/or outer surface roughness reduces the amount residual fluid. Residual fluid within the glass tube element can give rise to growth of microorganisms which could harm the health of animals or humans. Furthermore, a smaller outer surface roughness gives a more pleasant feeling when holding the glass tube element in the hand. The mentioned roughness values can be obtained by fire-polishing the glass.

Glass Compositions

The glass used for the wall of the glass tube element is not limited to a specific glass composition. The glass may be selected from the group consisting of soda-lime glass, borosilicate glass and aluminosilicate glass. Optionally, a borosilicate glass is used.

The glass of the glass tube element preferably comprises the following components in the indicated amounts (in wt. %):

| Component | Content (wt. %) |
| --- | --- |
| $SiO_2$ | 40 to 85 |
| $Al_2O_3$ | 0 to 25 |
| $Na_2O$ | 0 to 18 |
| $K_2O$ | 0 to 15 |
| MgO | 0 to 10 |

-continued

| Component | Content (wt. %) |
| --- | --- |
| $B_2O_3$ | 0 to 22 |
| $Li_2O$ | 0 to 10 |
| ZnO | 0 to 5 |
| CaO | 0 to 16 |
| BaO | 0 to 12 |
| $ZrO_2$ | 0 to 5 |
| $CeO_2$ | 0 to 0.5 |
| $SnO_2$ | 0 to 3 |
| $P_2O_5$ | 0 to 15 |
| $Fe_2O_3$ | 0 to 1.5 |
| $TiO_2$ | 0 to 10 |
| SrO | 0 to 1 |
| F | 0 to 1 |
| Cl | 0 to 1 |

$SiO_2$ is a relevant network former that can be used in the glass used for this of the invention. Therefore, the glasses may comprise $SiO_2$ in an amount of at least 60 wt. %. More preferably, the glass comprises $SiO_2$ in an amount of at least 62 wt. %, at least 65 wt. %, at least 68 wt. %, more than 70 wt. %, or even more than 75 wt. %. However, the content of $SiO_2$ in the glass should also not be extremely high because otherwise the meltability may be compromised. The amount of $SiO_2$ in the glass may be limited to at most 85 wt. %, or at most 82 wt. %. In embodiments, the content of $SiO_2$ in the glass is from 60 to 85 wt. %, or from >65 to 75 wt. %.

$B_2O_3$ may be used in order to enhance the network by increasing the bridge-oxide in the glass via the form of $[BO_4]$ tetrahedra. It also helps to improve the damage resistance of the glass. However, $B_2O_3$ should not be used in high amounts in the glass since it can decrease the ion-exchange performance. Furthermore, addition of $B_2O_3$ can significantly reduce the Young's modulus. The glass may comprise $B_2O_3$ in an amount of from 0 to 20 wt. %, preferably from 0 to 15 wt. %, preferably from 0.1 to 13 wt. %. In embodiments, the glass preferably comprises at least 5 wt. %, more preferably at least 7 wt. %, or at least 10 wt. % of $B_2O_3$.

$P_2O_5$ may be used in the glass of the invention in order to help lowering the melting viscosity by forming $[PO_4]$ tetrahedra, which can significantly lower the melting point without sacrificing anti-crystallization features. Limited amounts of $P_2O_5$ do not increase geometry variation very much, but can significantly improve the glass melting, forming performance, and ion-exchanging (chemical toughening) performance. However, if high amounts of $P_2O_5$ are used, geometry expansion upon chemical toughening may be increased significantly. Therefore, the glasses may comprise $P_2O_5$ in an amount of from 0 to 4 wt. %, or from 0 to 2 wt. %. In some embodiments, the glass is free of $P_2O_5$.

It is believed that $Al_2O_3$ can easily form tetrahedra coordination when the alkaline oxide ratio content is equal or higher than that of $Al_2O_3$. $[AlO_4]$ tetrahedra coordination can help building up more compact network together with $[SiO_4]$ tetrahedra, which can result in a low geometry variation of the glass. $[AlO_4]$ tetrahedra can also dramatically enhance the ion-exchange process during chemical toughening. Therefore, $Al_2O_3$ is preferably contained in the glasses in an amount of at least 0 wt. %, more preferably of more than 1 wt. %, more preferably of more than 4 wt. %. However, the amount of $Al_2O_3$ should also not be very high because otherwise the viscosity may be very high so that the meltability may be impaired. Therefore, the content of $Al_2O_3$ in the glasses is preferably at most 20 wt. %, at most 12 wt. %, or at most 10 wt. %. In preferred embodiments, the content of $Al_2O_3$ in the glasses is from 0 to 20 wt. %, from 1 to 12 wt. %, from 4 to 10 wt. %.

$TiO_2$ can also form $[TiO_4]$ and can thus help building up the network of the glass, and may also be beneficial for improving the acid resistance of the glass. However, the amount of $TiO_2$ in the glass should not be very high. $TiO_2$ present in high concentrations may function as a nucleating agent and may thus result in crystallization during manufacturing. Preferably, the content of $TiO_2$ in the glasses is from 0 to 10 wt. %, or up to 7 wt. %. In some embodiments, the glass comprises at least 0.5 wt. %, at least 2 wt. %, or at least 3 wt. % of $TiO_2$. In an embodiment, the glass is free of $TiO_2$.

$ZrO_2$ has the functions of lowering the CTE and improving the alkaline resistance of a glass. It may increase the melting viscosity, which can be suppressed by using $P_2O_5$. Like alkaline metals, $Zr^{4+}$ is also a network modifier. Furthermore, $ZrO_2$ is a significant contributor for increased Young's modulus. Preferably, the content of $ZrO_2$ in the glasses is from 0 to 5 wt. %, up to 2 wt. %. The glass may be free of $ZrO_2$. In some embodiments, the glass comprises at least 0.1 wt. %, or at least 0.2 wt. % $ZrO_2$.

Alkaline oxides $R_2O$ ($Li_2O+Na_2O+K_2O+Cs_2O$) may be used as network modifiers to supply sufficient oxygen anions to form the glass network. Preferably, the content of $R_2O$ in the glasses is more than 4 wt. %, or more than 12 wt. %. However, the content of $R_2O$ in the glass should not be very high because otherwise chemical stability and chemical toughenability may be impaired. Preferably, the glasses comprise $R_2O$ in an amount of at most 30 wt. %, at most 25 wt. %, or at most 20 wt. %. Other embodiments are free of alkaline oxides, or at least free of $Na_2O$, $K_2O$, $Cs_2O$ and/or $Li_2O$ $Li_2O$ can help improving the Young's modulus and lowering CTE of the glass. $Li_2O$ also influences the ion-exchange greatly. It was surprisingly found that Li-containing glass has a smaller geometry variation. Therefore, the content of $Li_2O$ in the glasses may be set to at least 0 wt. %, or more than 5 wt. %, or even more than 10 wt. %. However, the content of $Li_2O$ should not be very high because otherwise chemical stability and chemical toughenability may be impaired. Preferably, the content of $Li_2O$ in the glasses is at most 24 wt. %, less than 15 wt. %, or even 0 wt. %.

$Na_2O$ may be used as a network modifier. However, the content of $Na_2O$ should not be very high because otherwise chemical stability and chemical toughenability may be impaired. Preferably, the content of $Na_2O$ in the glasses is from 0 to 15 wt. %, preferably from 2 to 15 wt. %. In preferred embodiments, the content of $Na_2O$ in the glasses is at least 5 wt. %, at least 8 wt. %, or at least 10 wt. %.

$K_2O$ may be used as a network modifier. However, the content of $K_2O$ should not be very high because otherwise chemical stability and chemical toughenability may be impaired. Preferably, the content of $K_2O$ in the glasses is from 0 to 15 wt. %, or from >0.5 to 7 wt. %. The glass may be free of $K_2O$.

Preferably, the glasses comprise more $Na_2O$ than $K_2O$. Thus, preferably the molar ratio $Na_2O/(Na_2O+K_2O)$ is from >0.5 to 1.0, from >0.6 to 1.0, from >0.7 to 1.0, or from >0.8 to 1.0.

Preferably, the content of the sum of $Li_2O$ and $Na_2O$ in the glasses is more than 10 mol-%, or more than 15 mol-%. However, the content of the sum of $Li_2O$ and $Na_2O$ in the glasses should not be very high. Preferably, the content of the sum of $Li_2O$ and $Na_2O$ in the glasses is at most 25 mol-%, or at most 20 mol-%.

The glasses may also comprise alkaline earth metal oxides as well as ZnO which are collectively termed "RO" in the present specification. Alkaline earth metals and Zn may serve as network modifiers. Preferably, the glasses comprise RO in an amount of from 0 to 20 wt. %, preferably from 0 to 15 wt. %. In some embodiments, the glass preferably comprises at least 0.5 wt. %, more preferably at least 1 wt. %, more preferably at least 5 wt. % of RO. Preferred alkaline earth metal oxides are selected from the group consisting of MgO, CaO, SrO und BaO. More preferably, alkaline earth metals are selected from the group consisting of MgO und CaO. More preferably, the alkaline earth metal is MgO. Preferably, the glass comprises MgO in an amount of from 0 to 10 wt. %. In some embodiments, the glass comprises at least 0.5 wt. %, at least 1 wt. %, or at least 2 wt. % of MgO. Preferably, the glass comprises CaO in an amount of from 0 to 16 wt. %, preferably from 0 to 13 wt. %, preferably from 0 to 10 wt. %. In some embodiments, the glass comprises at least 0.5 wt. %, at least 1 wt. %, at least 5 wt. %, at least 10 wt. %, or at least 12 wt. % of CaO. Preferably, the glass comprises BaO in an amount of from 0 to 12 wt. %, preferably from 0 to 10 wt. %. In some embodiments, the glass comprises at least 0.5 wt. %, at least 2 wt. %, or at least 7 wt. % of BaO. The glass may be free of BaO, MgO and/or CaO.

Preferably, the glass comprises ZnO in an amount of from 0 to 5 wt. %. In some embodiments, the glass comprises at least 0.5 wt. %, at least 1 wt. %, or at least 2 wt. % of ZnO. In other embodiments, the glass is free of ZnO. Preferably, the content of the sum of MgO and ZnO in the glasses is from 0 to 10 wt. %. In some embodiments, the content of the sum of MgO and ZnO in the glasses at least 0.5 wt. %, more preferably at least 1 wt. %, more preferably at least 2 wt. %.

At the end, when forming a glass by mixing different types of the oxides, the integrated effect should be considered to achieve a glass with comparatively low expansion, which is supported by high densification of the glass network. It means, in addition to $[SiO_4]$ tetrahedral $[BO_4]$ tetrahedra, $[AlO_4]$ tetrahedra, or $[PO_4]$ tetrahedra are expected to help connect the $[SiO_4]$ more effectively rather than other type of polyhedrons. In other words, $[BO_3]$ triangle and $[AlO_6]$ octahedron, for instance, are not preferred. It means, sufficient oxygen anions are preferable to be offered by adding proper amounts of metal oxides, such as $R_2O$ and RO.

Preferably, the content of $SnO_2$ in the glasses is from 0 to 3 wt. %. More preferably, the glasses are free of $SnO_2$. Preferably, the content of $Sb_2O_3$ in the glasses is from 0 to 3 wt. %. More preferably, the glasses are free of $Sb_2O_3$. Preferably, the content of $CeO_2$ in the glasses is from 0 to 3 wt. %. High contents of $CeO_2$ are disadvantages because $CeO_2$ has a coloring effect. Therefore, more preferably, the glasses are free of $CeO_2$. Preferably, the content of $Fe_2O_3$ in the glasses is from 0 to 3 wt. %. More preferably, the glasses are free of $Fe_2O_3$.

The glass described herein is described as having a composition of different constituents. This means that the glass contains these constituents without excluding further constituents that are not mentioned. However, in preferred embodiments, the glass consists of the components mentioned in the present specification to an extent of at least 95%, more preferably at least 97%, most preferably at least 99%. In most preferred embodiments, the glass essentially consists of the components mentioned in the present specification.

Optionally, coloring oxides can be added, such as $Nd_2O_3$, $Fe_2O_3$, CoO, NiO, $V_2O_5$, $MnO_2$, CuO, $CeO_2$, $Cr_2O_3$.

0-2 wt. % of $As_2O_3$, $Sb_2O_3$, $SnO_2$, $SO_3$, Cl and/or F could be also added as refining agents. 0-5 wt. % of rare earth oxides could also be added to add optical or other functions to the glass wall.

The terms "X free" and "free of component X", or "0% of X", respectively, as used herein, refer to a glass, which essentially does not comprise said component X, i.e., such component may be present in the glass at most as an impurity or contamination, however, is not added to the glass composition as an individual component. This means that the component X is not added in essential amounts. Non-essential amounts according to the present invention are amounts of less than 100 ppm, preferably less than 50 ppm and more preferably less than 10 ppm. Preferably, the glasses described herein do essentially not contain any components that are not mentioned in this description.

In embodiments, the glass used for the glass tube element has the following composition in percent by weight:

| Component | Content (wt. %) |
|---|---|
| $SiO_2$ | 40 to 85 |
| $Al_2O_3$ | 0 to 25 |
| $Na_2O$ | 2 to 18 |
| $K_2O$ | 0 to 15 |
| MgO | 0 to 10 |
| $B_2O_3$ | 0 to 15 |
| $Li_2O$ | 0 to 10 |
| ZnO | 0 to 5 |
| CaO | 0 to 10 |
| BaO | 0 to 5 |
| $ZrO_2$ | 0 to 5 |
| $CeO_2$ | 0 to 0.5 |
| $SnO_2$ | 0 to 3 |
| $P_2O_5$ | 0 to 15 |
| $Fe_2O_3$ | 0 to 1.5 |
| $TiO_2$ | 0 to 10 |
| SrO | 0 to 1 |
| F | 0 to 1 |
| Cl | 0 to 1 |

In embodiments, the glass used for the glass tube element has the following composition in percent by weight:

| Component | Content (wt. %) |
|---|---|
| $SiO_2$ | 55 to 65 |
| $Al_2O_3$ | 10 to 20 |
| $Na_2O$ | 0 to 3 |
| $K_2O$ | 0 to 3 |
| MgO | 0 to 5 |
| $B_2O_3$ | 0 to 6 |
| $Li_2O$ | 0 to 3 |
| ZnO | 0 to 3 |
| CaO | 7 to 15 |
| BaO | 5 to 10 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

In embodiments, the glass used for the glass tube element has the following composition in percent by weight:

| Component | Content (wt. %) |
|---|---|
| $SiO_2$ | 65 to 85 |
| $Al_2O_3$ | 0 to 7 |
| $Na_2O$ | 0.5 to 10 |
| $K_2O$ | 0 to 10 |
| MgO | 0 to 3 |
| $B_2O_3$ | 8 to 20 |
| $Li_2O$ | 0 to 3 |
| ZnO | 0 to 3 |
| CaO | 0 to 3 |
| BaO | 0 to 3 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

In embodiments, the glass used for the glass tube element has the following composition in percent by weight:

| Component | Content (wt. %) |
|---|---|
| $SiO_2$ | 60 to 80 |
| $Al_2O_3$ | 0 to 5 |
| $Na_2O$ | 10 to 18 |
| $K_2O$ | 0 to 5 |
| MgO | 0 to 5 |
| $B_2O_3$ | 0 to 5 |
| $Li_2O$ | 0 to 3 |
| ZnO | 0 to 3 |
| CaO | 2 to 10 |
| BaO | 0 to 5 |
| $ZrO_2$ | 0 to 3 |
| $CeO_2$ | 0 to 0.5 |
| $SnO_2$ | 0 to 3 |
| $P_2O_5$ | 0 to 3 |
| $Fe_2O_3$ | 0 to 1.5 |
| $TiO_2$ | 0 to 3 |
| SrO | 0 to 1 |
| F | 0 to 1 |
| Cl | 0 to 1 |

Optional Additional Treating of the Glass Tube Element

For optional chemical toughening, the glass may be immersed in a salt bath. The salt bath may contain sodium and/or potassium salts. The salt for the salt bath may comprise Na, K or Cs nitrate, sulfate or chloride salts or a mixture of one or more thereof. Preferred salts are $NaNO_3$, $KNO_3$, NaCl, KCl, $K_2SO_4$, $Na_2SO_4$, $Na_2CO_3$, $K_2CO_3$, or combinations thereof. Additives like NaOH, KOH and other sodium or potassium salts may also be used for better controlling the speed of ion-exchange, compressive stress and DoL during chemical toughening. In an embodiment, the salt bath comprises $KNO_3$, $NaNO_3$, $CsNO_3$ or mixtures thereof.

The temperature during chemical toughening may range from 320° C. to 700° C., from 350° C. to 500° C., or from 380° C. to 450° C. If the toughening temperature is very low, the toughening rate will be low. Therefore, chemical toughening is preferably done at a temperature of more than 320° C., more preferably more than 350° C., more preferably more than 380° C., more preferably at a temperature of at least 400° C. However, the toughening temperature should not be very high because very high temperatures may result in strong compressive stress relaxation and low compressive stress. Preferably, chemical toughening is done at a temperature of less than 500° C., more preferably less than 450° C.

The time for chemical toughening may range from 5 min to 48 h, from 10 min to 20 h, from 30 min to 16 h, or from 60 min to 10 h. In preferred embodiments, the duration of chemical toughening is of from 0.5 to 16 h. Chemical toughening may either done in a single step or in multiple steps, in particular in two steps. If the duration of toughening is very low, the resulting DoL may be very low. If the duration of toughening is very high, the CS may be relaxed very strongly. The duration of each toughening step in a multistep toughening procedure is preferably between 0.05 and 15 hours, more preferably between 0.2 and 10 hours, more preferably between 0.5 and 6 hours, more preferably between 1 and 4 hours. The total duration of chemical toughening, in particular the sum of the durations of the two or more separate toughening steps, is preferably between 0.01 and 20 hours, more preferably between 0.2 and 20 hours, more preferably between 0.5 and 15 hours, more preferably between 1 and 10 hours, more preferably between 1.5 and 8.5 hours. Glass tube element may be chemically toughened such that it has a DoL of at least 10 µm, or at least 20 µm. In some embodiments, the DoL may be up to 80 µm, up to 60 µm or up to 50 µm.

In some embodiments, the glass is chemically toughened with a mixture of $KNO_3$ and $NaNO_3$. In embodiments, the mixture comprises less than 50 mol % $NaNO_3$, less than 30 mol % $NaNO_3$, less than 20 mol % $NaNO_3$, less than 10 mol % $NaNO_3$, or less than 5 mol % $NaNO_3$. In some embodiments, the glass is chemically toughened with a mixture of $KNO_3$ and $CsNO_3$. In embodiments, the mixture comprises less than 50 mol % $CsNO_3$, less than 30 mol % $CsNO_3$, less than 20 mol % $CsNO_3$, less than 10 mol % $CsNO_3$, or less than 5 mol % $CsNO_3$. The balance may be $KNO_3$.

Chemical toughening with both $KNO_3$ and $NaNO_3$ may be done by using a mixture of $KNO_3$ and $NaNO_3$ or by performing separate toughening steps with essentially pure $NaNO_3$ and essentially pure $KNO_3$. Also in embodiments in which the glass is chemically toughened with mixtures of $KNO_3$ and $NaNO_3$, preferably two distinct consecutive toughening steps are performed. Preferably, the proportion of $KNO_3$ in the mixture used for the second toughening step is higher than the proportion of $KNO_3$ in the mixture used for the first toughening step. The chemical toughening can include multi steps in salt baths with alkaline metal ions of various concentrations to reach better toughening performance.

The toughening can be done by immersing the glass into a molten salt bath of the salts described above, or by covering the glass with a paste containing the ions described above, e.g., potassium ions and/or other alkaline metal ions, and heating to a high temperature for a certain time. The alkaline metal ions with larger ion radius in the salt bath or the paste exchange with alkaline metal ions with smaller radius in the glass article, and surface compressive stress is formed due to ion exchange.

A chemically toughened glass tube element of the invention may be obtained by chemically toughening at least the wall of the glass tube element of the present invention. The toughening process can be done by partially or completely immersing the glass tube element, the glass tube, the glass wall, or any intermediate glass article into an above-described salt bath, or subjecting it to a salt paste. The monovalent ions in the salt bath have radii larger than alkali ions inside the glass. A compressive stress to the glass is built up after ion-exchange due to larger ions squeezing in the glass network. After the ion-exchange, the strength and flexibility of the glass is surprisingly and significantly improved. In addition, the compressive stress induced by chemical toughening may increase scratch resistance of the glass tube element. Improved scratch resistance is particularly relevant for glass tube elements because scratches affect both mechanical and chemical resistance of a glass surface as well as optical appearance.

After chemical toughening, the glass tubes are taken out of the salt bath, then cleaned with water and dried. Compressive stress layers are formed on the outer surface and/or inner surface of strengthened glass tubes. Correspondingly, a tensile stress is formed in the core part of the glass tubing wall.

It is acknowledged that preferably any existing stress layers or stress patterns may be superimposed with the stress layers or stress patterns introduced by subsequent chemical toughening. Especially the depth of the stress layers/patterns introduced by chemical toughening may be for example 50 µm while other stress layers/patterns may extend across the entire depth of the glass material. This might lead to the situation that any former stress layers/patterns or parts thereof is or are at least in some volume/surface domains biased by some value dependent on the chemical toughening process.

Toughening

One or more types of toughening might be applied to the glass tube element during the manufacturing process. For example a glass tube element might be chemically toughened. This type of toughening is explained in detail elsewhere in this application.

The threshold diffusivity D of the wall of the glass tube element preferably is at least 1.5 µm²/hour, more preferably at least 4 µm²/hour. The chemical toughening performance of glass can be described by the threshold diffusivity D. The threshold diffusivity D can be calculated from the measured depth of layer (DoL) and the ion exchange time (IET) according to the relationship: DoL=~1.4 sqrt (4*D*IET). The threshold diffusivity may for example be measured when chemically toughening the glass at 410° C. in $KNO_3$ for 8 hours. The glass used for the glass tube element may have excellent chemical toughening performance which allows for a very economic production. Thus, the glass may have a threshold diffusivity D of at least 1.5 µm²/hour. Preferably, the glass of the present invention has a threshold diffusivity D of at least 4 µm²/hour, at least 6 µm²/hour, at least 8 µm²/hour, at least 10 µm²/hour, at least 12 µm²/hour, at least 14 µm²/hour, at least 16 µm²/hour, at least 18 µm²/hour, at least 20 µm²/hour, at least 25 µm²/hour, at least 30 µm²/hour, at least 35 µm²/hour, or even at least 40 µm²/hour. In an embodiment, the threshold diffusivity is up to 60 µm²/hour or up to 50 µm²/hour.

In some embodiments chemical toughening is employed.

Cutting Mechanism

In preferred embodiments at least one out of three cutting mechanisms might be applied for manufacturing the glass tube elements, i.e., to prepare the desired length of each glass tube element from a longer glass element such as a glass tube line: 1. scratching, which means that at desired positions the longer glass element is scratched and broken in order to obtain the individual glass tube elements. This technique might be also referred to as "score broken". 2. Sawing, which means that at the desired positions the longer glass element is sawed so that individual glass tube elements are obtained. 3. Laser cutting, which means that the individual glass tube elements are obtained in that a laser cuts the individual pieces from the longer glass element.

In preferred embodiments a laser cutting technique is employed.

Polishing

In preferred embodiments all or at least one or more parts of the glass tube elements can be made subject to fire polishing. This means that the material is exposed to a flame or heat, for example during drawing of the glass tube or afterwards. This might result in a smoothening of the surface. Preferably at least the end sections of the glass tube elements are fire polished. More preferably the entire glass tube element is fire polished, at least its outer surface. Reference is also made to the discussion made with respect to surface roughness above.

Figure 2:
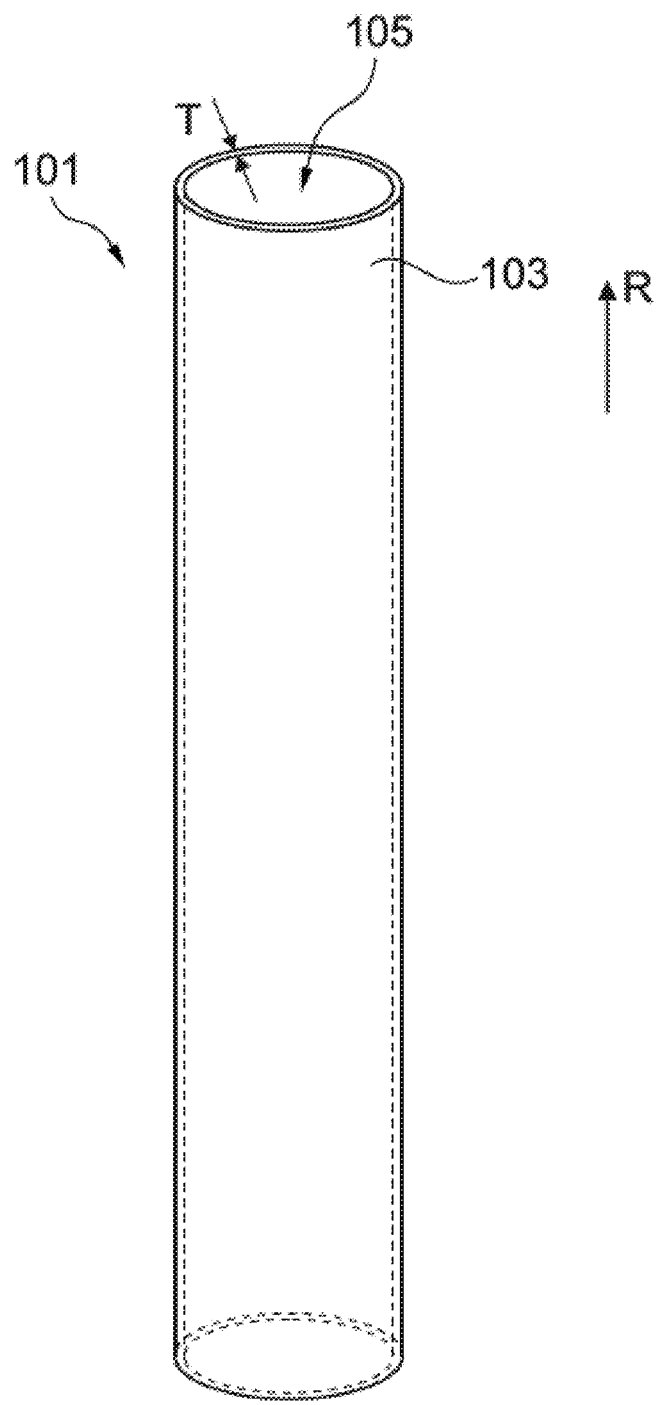
FIG. 2 shows a glass tube element according to the invention.

FIG. 2 shows a glass tube element 101 according to the invention.

It has a hollow cylindrical form (not only a section thereof, but entirely) and a shell 103 which encloses a lumen 105. The length (this is, from top to bottom) of the glass tube element 101 is 1.5 m. The maximal outer diameter of the glass tube element 101 is between 6 and 25 mm. Indeed, the nominal outer diameter is 24 mm. The shell 103 has an average thickness T of 1 mm.

There is a specific cross-sectional plane perpendicular to the direction R of the main extension of the glass tube element 101 in which plane the difference of the minimal and maximal outer diameter of the shell 103 has the largest absolute value. (There can be, of course, more than one plane which is perpendicular and in which the difference has the same maximal value. In this case every one of the planes can be chosen as specific cross-sectional plane.)

A first ratio of the difference value of the minimal and the maximal value of the outer diameter of the shell in the specific cross-sectional plane of the glass tube element on the one hand and the mean value of the minimal and maximal value of the outer diameter of the shell in the specific cross-sectional plane of the glass tube element on the other hand is defined. For the glass tube element 101 this first ratio is smaller than $4 \times 10^{-3}$.

Furthermore, a second ratio of a specific distance and 1 meter is defined.

Some sub-section of the section of the glass tube element 101 having at least one start and at least one end is or can be selected, wherein a distance of 1 meter is or can be measured along a straight line (not shown in FIG. 2) from the start to the end.

For every point of the center axis (not shown in FIG. 2) of the sub-section of the section of the glass tube element 101 a shortest distance to the straight line is or can be identified.

The specific distance being defined as the largest of all shortest distances. For the glass tube element 101 this second ratio is smaller than $0.7 \times 10^{-3}$.

The product of the first and second ratio is smaller than $4.0 \times 10^{-6}$ for the glass tube element 101.

Figure 3:
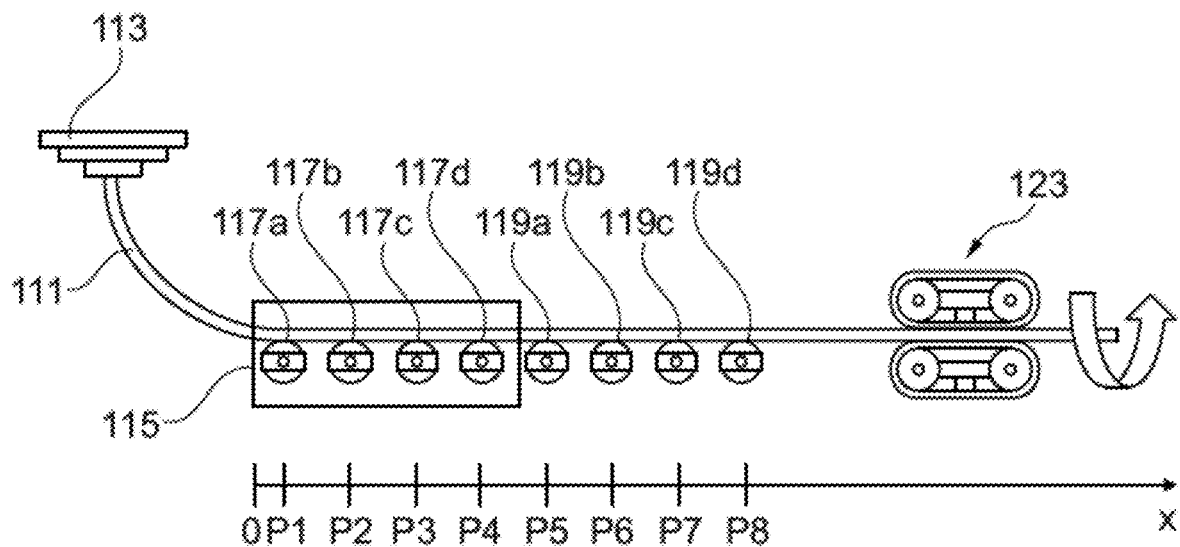
FIG. 3 shows a schematic illustration of a first exemplary production line.

FIG. 3 shows a schematic illustration of a first exemplary production line for producing a glass tube element such as the glass tube element 101.

A glass tube line 111 formed by some forming device 113 is redirected into a horizontal direction. The forming device 113 is not specified in more detail here, but it may be designed for conducting for example a Danner process or a Vello process.

It is acknowledged that the glass tube element is part of the glass tube line 111. Alternatively it might be stated that the glass tube element during its production process is connected to further glass tube elements in one piece. From the glass tube line 111 subsequently glass tube elements, such as the glass tube element 101, are confectioned.

Therefore, even if reference is made to the glass tube line 111, the person skilled in the art clearly understands that every treatment the glass tube line 111 undergoes is also applied to the glass tube elements because these elements correspond to respective sections of the glass tube line 111. Vice versa the same is true: If it is stated that a glass tube element is treated somehow, this is the same as if the glass tube line, from which the glass tube element has been confectioned, is treated that way (unless otherwise stated or evident from the context).

Starting from a Position of x=0 (see FIG. 3) the glass tube line 111 runs in a horizontal direction parallel to the x axis corresponding to a defined path of movement. The glass tube line 111 has a defined speed of movement, preferably of 30 cm/s. The glass tube line 111, hence the glass tube element corresponding to the respective section of the glass tube line 111, passes with the defined speed of movement through a cooling device 115, for setting up a locally modified cooling rate of the glass tube line 111 (hence the glass tube elements). The glass tube line 111 has at least temporarily a surface temperature of between Tg−50 and Tg+150 degrees C. while passing through/along the cooling device 115. Tg means the transition temperature.

The cooling device 115 has a plurality of four contacting devices 117a-117d. Each contacting device 117a-117d is designed in form of a castor. The contacting devices 117a-117d has at least from time to time direct contact with at least one area of the outer surface of the glass tube line 111 (hence the corresponding glass tube elements).

To be more precise, the four contacting devices 117a-117d comes in contact with the outer surface of the glass tube element (i.e., the respective section of the glass tube line 111) one after another in time. A section of the class tube line 111 corresponding to a glass tube element such as the glass tube element 101 first comes in contact with contacting device 117a, then with contacting device 117b, then with contacting device 117c, and finally with contacting device 117d. Of course, this does not exclude that more than one contacting device has contact at the same time with the outer surface.

The locally modified cooling rate of the glass tube line 111 is achieved by means of the contacting devices 117a-117d. The contacting devices 117a-117d all have, at least in the area where the glass tube line 111 is contacted, a thermal conductivity of between 1 and 100 W/(m*K). Indeed, it is preferably between 30 and 50 W/(m*K). This allows to manipulate and change the cooling rate.

Changing the cooling rate has been proven to lead to improved geometric parameters, hence, to improved values for the first and second ratios, hence to improved quality of the glass tube element.

The contacting devices 117a-117d are located at spatial positions P1 . . . P4 down along the path of movement in a consecutive manner. Each of two contacting devices arranged in a consecutive manner (i.e., preferably they are direct neighbors) have a center-center-distance, preferably measured along the path of movement, of 50 cm or less. Indeed, the center-center-distance is 50 cm. Further contacting devices 119a-119d are provided at spatial positions P5 . . . P8.

Figure 4:
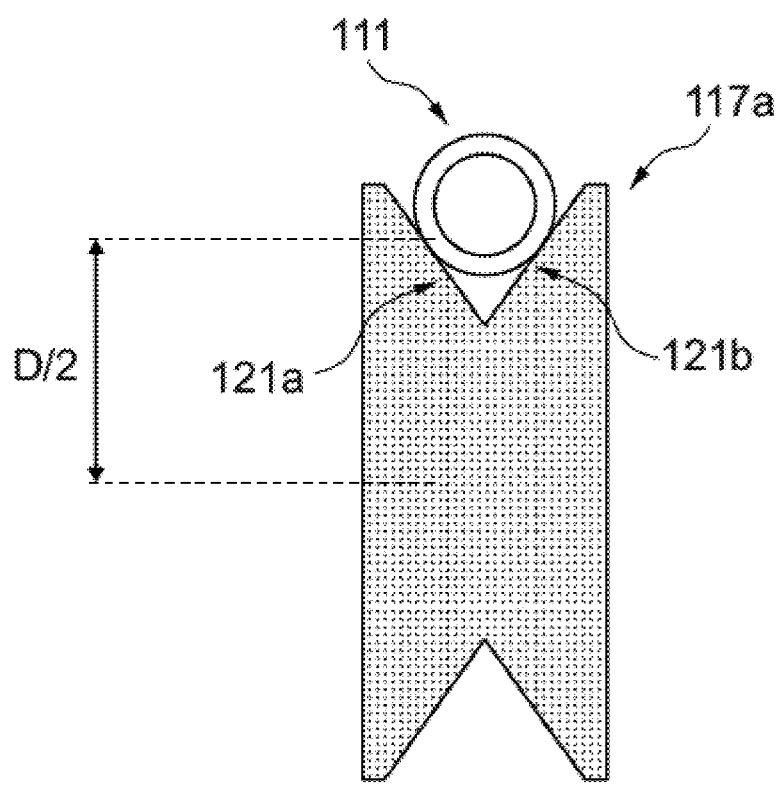
FIG. 4 shows a schematic cross-sectional view of a contacting device.

FIG. 4 shows a schematic cross-sectional view of a contacting device, such as castor, for example castor 117a. The view is obtained by a cutting plane perpendicular to the x axis in FIG. 2 such that the view comprises the center axis of the contacting device.

The castor 117a (and likewise castors 117b-117d) have a V-like recess, which allows to support and/or move the glass tube line 111 along the path of movement. This shaping allows that the contacting device, such as the castor 117a, has at the same time contact with two areas 121a, 121b of the outer surface of the class tube line 111 (hence the class tube elements) by respective contacting areas of the contacting device. The contacting areas and the areas of the outer surface 121a, 121b contacted by the contacting device 117a are separated from each other.

The areas 121a, 121b are produced by surface areas of the castors, i.e., the contacting areas, which have at least one point which in turn has a distance D/2 of 10 cm or less from the center axis of the castor 117a.

Once the glass tube line 111 (or a section thereof corresponding to a glass tube element) exits the cooling device 115, the glass tube line 111 has a surface temperature of less than Tg−50 degrees C. Of course, this is not necessary and it may still has a surface temperature of between Tg−50 and Tg+150 degrees C. However, in the preferred setup the temperature is below Tg−50 degrees C. This is true because in this case, subsequent contacts of the glass tube line 111 with other elements have no or no significant or at least no adverse effect on any preferred properties of the glass tube line 111 (hence, the glass tube elements).

Indeed, in the setup of FIG. 3, following the cooling device 115, the glass tube line 111 get in contact with the further castors 119a-119d provided at spatial positions P5 . . . P8 down along the path of movement in a consecutive manner. However, they might be different from the castors 117a-117d comprised by the cooling device 115 because they are not part of the cooling device 115 and are not used for manipulating the cooling characteristics of the glass tube line 111.

Of course, in other preferred embodiments the castors 119a-119d might correspond to contacting devises of a second cooling device.

As indicated by the circular arrow in FIG. 3, the glass tube line 111 is rotated during its period of cooling with a rotation speed of 1 round or more per second. Indeed, the glass tube line 111 is rotated the entire time until confectioning, hence, also during the period of cooling.

Downstream of some transport device 123, the glass tube line 111 is confectioned so that individual glass tube elements, such as the glass tube element 101, are obtained from that line with a desired length.

Figure 5:
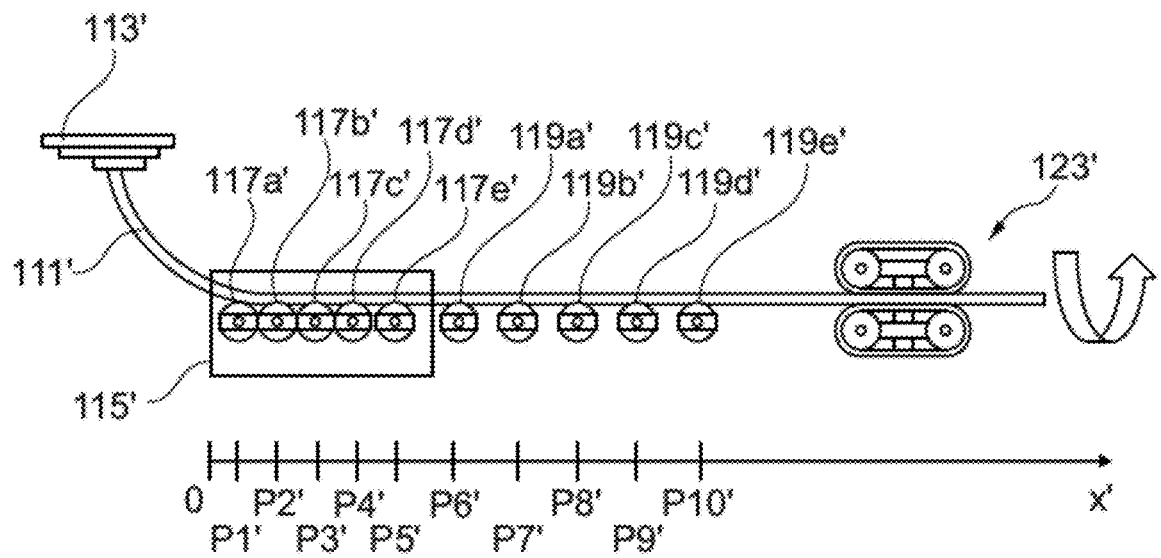
FIG. 5 shows a schematic illustration of a second exemplary production line.

FIG. 5 shows a schematic illustration of a second exemplary production line for producing a glass tube element such as the glass tube element 101. Structural features of the second exemplary production line which are identical or similar to the structural features of the first exemplary production line are labeled in FIG. 5 with the same reference numerals, but with a single dash.

It is apparent that the second exemplary production line is largely similar to the first exemplary production line described with respect to FIG. 3. Therefore, only differences between the first and second exemplary production line need to be discussed here. In addition, reference can be made to the above explanations with respect to FIG. 3.

The production line of FIG. 5 comprises a cooling device 115' which has a plurality of five contacting devices 117a'-117e'.

The contacting devices 117a'-117e' are located at spatial positions P1' . . . P5' down along the path of movement in a consecutive manner. Each of two contacting devices arranged in a consecutive manner (i.e., preferably they are direct neighbors) have a center-center-distance, preferably measured along the path of movement, of 50 cm or less. Indeed, the center-center-distance is 30 cm.

This means, there has been added one contacting device 117e'. And the center-center-distance between adjacent contacting devices 117a'-117e' has been reduced from 50 cm to 30 cm.

This setup allows an increased interaction between the cooling device 115' and the glass tube line 111' during the period of cooling.

It has been proven to be advantageous to apply such an increased interaction, even if it comes on cost of a larger setup. The resulting glass tube elements have improved geometric parameters, especially improved first and second ratios, hence to improved quality of the glass tube element.

The further castors 119a'-119e' at spatial positions P6' . . . P10' are not comprised by the cooling device 115'.

Figure 6:
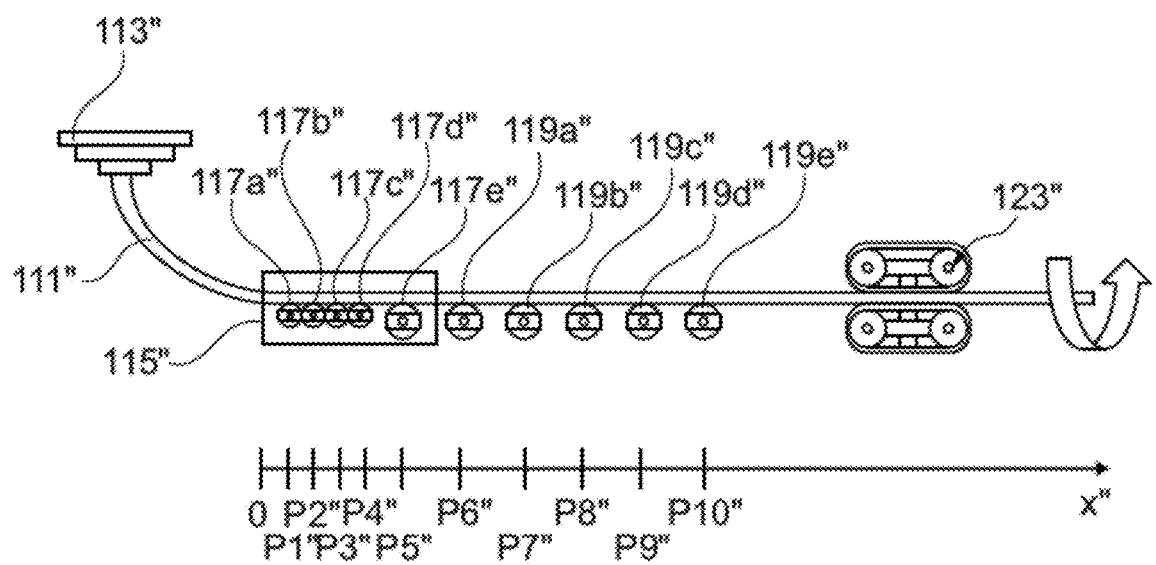
FIG. 6 shows a schematic illustration of a third exemplary production line.

FIG. 6 shows a schematic illustration of a third exemplary production line for producing a glass tube element such as the glass tube element 101. Structural features of the third exemplary production line which are identical or similar to the structural features of the first and/or second exemplary production line are labeled in FIG. 6 with the same reference numerals, but with a double dash.

It is apparent that the third exemplary production line is largely similar to the first and second exemplary production line described with respect to FIG. 3 and FIG. 5. Therefore, only differences between the first, second and third exemplary production line need to be discussed here. In addition, reference can be made to the above explanations with respect to FIG. 3 and FIG. 5.

The production line of FIG. 6 comprises a cooling device 115" which has a plurality of five contacting devices 117a"-117e" located at spatial position P1" . . . P5" down along the path of movement in a consecutive manner.

The plurality of contacting devices 117a"-117e" can be grouped into two groups with respect to the aspects diameter and center-center-distance.

The first group comprises contacting devices 117a"-117d" at spatial positions P1" . . . P4" and the second group comprises contacting device 117e" at spatial position P5". The contacting devices 117a"-117d" of the first group have a smaller diameter than the contacting device 117e' of the second group. The smaller diameter allows that the center-center-distance of adjacent contacting devices 117a"-117d" is reduced to 3 cm.

This setup allows an increased interaction between the cooling device 115" and the glass tube line 111" during the period of cooling. It has been proven to be advantageous to have contacting devices which are closer together. Hence, by reducing the size, especially the diameter of a contacting device which is designed as a castor, more contacting devices can be applied during higher temperatures.

Since in the setup of FIG. 6 different castors are used, different interactions are obtained based inter alia on: Time of first contact and castor diameter.

Figure 7:
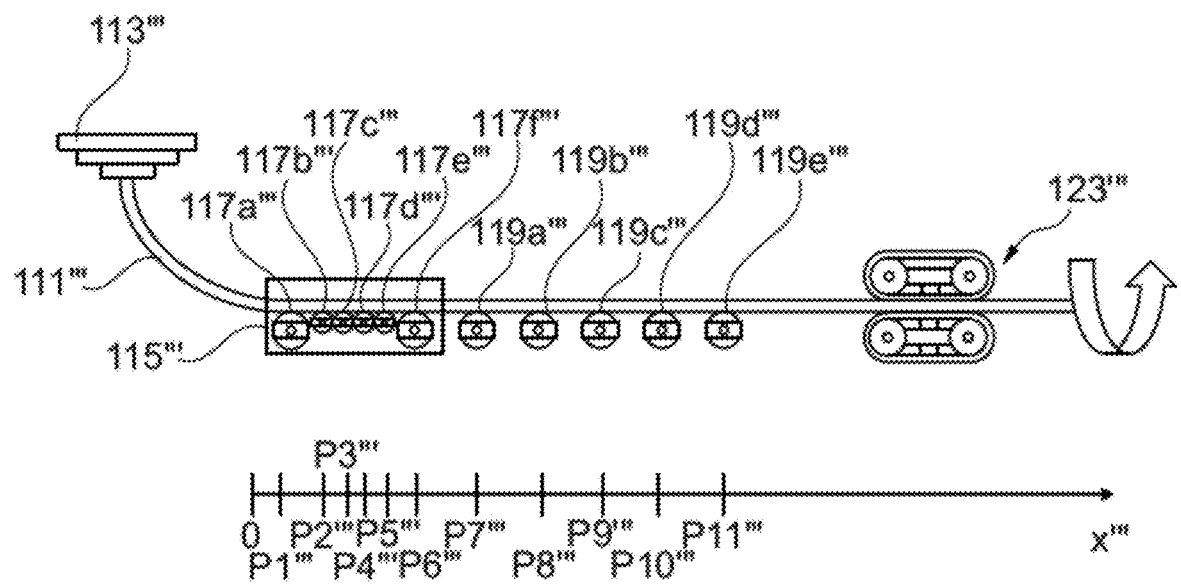
FIG. 7 shows a schematic illustration of a fourth exemplary production line.

FIG. 7 shows a schematic illustration of a fourth exemplary production line for producing a glass tube element such as the glass tube element 101. Structural features of the fourth exemplary production line which are identical or similar to the structural features of the first, second and/or third exemplary production line are labeled in FIG. 7 with the same reference numerals, but with a triple dash.

It is apparent that the fourth exemplary production line is largely similar to the first, second and third exemplary production line described with respect to FIG. 3, FIG. 5 and FIG. 6. Therefore, only differences between the first, second, third and fourth exemplary production line need to be discussed here. In addition, reference can be made to the above explanations with respect to FIG. 3, FIG. 5 and FIG. 6.

The production line of FIG. 7 comprises a cooling device 115''' which has a plurality of six contacting devices 117a'''-117f''' located at spatial positions P1''' . . . P6''' down along the path of movement in a consecutive manner.

The plurality of contacting devices 117a'''-117f''' can be grouped into two groups with respect to the aspects diameter and center-center-distance.

The first group comprises contacting devices 117b'''-117d''' at spatial positions P2''' . . . P4''' and the second group comprises contacting devices 117a''' and 117f''' at spatial position P1''' and P5'. The contacting devices 117b'''-117d''' of the first group have a smaller diameter than the contacting devices 117a''' and 117f''' of the second group. The smaller diameter allows that the center-center-distance of adjacent contacting devices 117b'''-117d''' is reduced to 3 cm.

The arrangement of the contacting devices 117a'''-117f' is such that the class tube line 111" comes in contact first with the contacting device 117a''' of the second group than one after the other of contacting devices 117b'''-117d''' of the first group and finally with contacting device 117e''' of the second group.

In other words, the first interaction between the class tube line 111" and the cooling device 115''' is by means of the contacting device 117a''' which has a large diameter. Then the interaction takes place by means of the contacting devices 117b'''-117e''' which have smaller diameters. Finally interaction takes place with the contacting device 117f''' having a larger diameter.

This alternating interaction leads to improved geometric parameters and quality of the final glass tube element.

The further castors 119a'''-119d''' at spatial positions P6' . . . P10' are not comprised by the cooling device 115'''.

Figure 8:
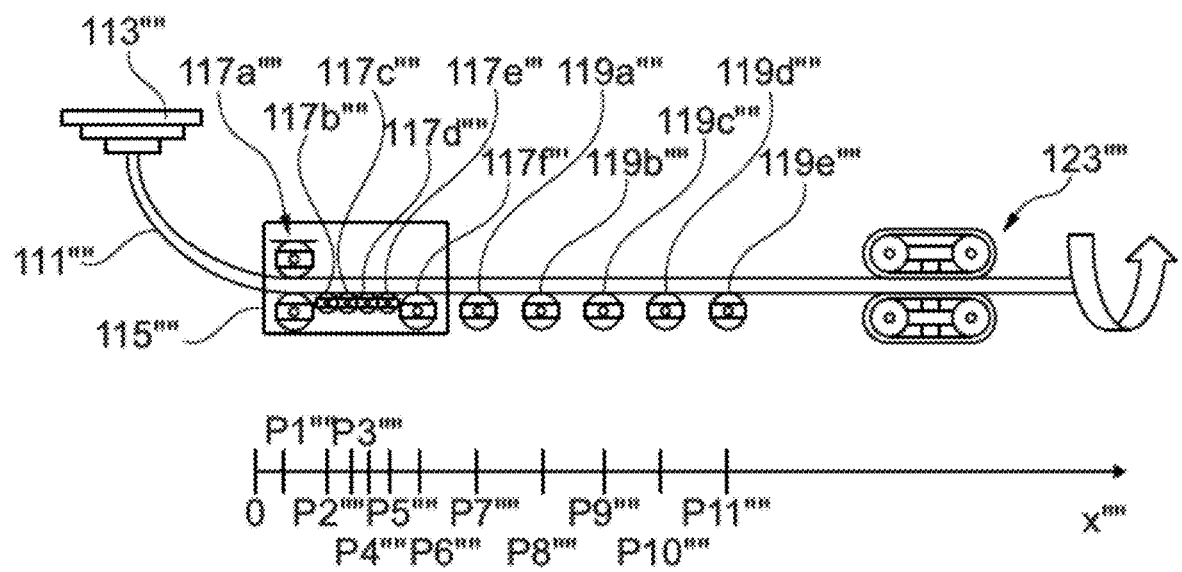
FIG. 8 shows a schematic illustration of a fifth exemplary production line.

FIG. 8 shows a schematic illustration of a fifth exemplary production line for producing a glass tube element such as the glass tube element 101. Structural features of the fifth exemplary production line which are identical or similar to the structural features of the first, second, third and/or fourth exemplary production line are labeled in FIG. 8 with the same reference numerals, but with a fourth-times dash.

The fifth exemplary production line is based particularly on the fourth exemplary production line described with respect to FIG. 7. Therefore, only differences between the fourth and fifth exemplary production line need to be discussed here. In addition, reference can be made to the above explanations with respect to FIG. 7.

The production line of FIG. 8 comprises a cooling device 115"" which in turn has a plurality of seven contacting devices 117a""-117f"" located at spatial positions P1"' . . . P6''' down along the path of movement in a consecutive manner. Indeed, with 117a" two contacting devices located both at P1"" are denoted which form a contacting device group. The contacting devices 117a"" of the contacting device group are arranged in a rotationally symmetrical manner around the glass tube line 111 (hence, around glass tube element 101).

In other words, one of the two contacting devices 117a"" are located horizontal above and the other horizontal below the glass tube line 111"".

This is just a further design option for increasing the number of interaction elements, especially contacting devices. This allows that at spatial position P1"" four contacting surfaces interact between the cooling device 115"" and the glass tube line 111"" with only little space requirements and consumption: Two contacting devices 117a"" each having two contacting areas (see description with respect to FIG. 4).

The features disclosed in the description, the figures as well as the claims could be essential alone or in every combination for the realization of the invention in its different embodiments.

LIST OF REFERENCE NUMERALS

1 Glass tube element
3 Shell
5 Lumen
7 Circle
9 Circle
11 Glass tube element
13 Support
15 Line
101 Glass tube element
103 Shell
105 Lumen
111, 111', 111", 111', 111"" Glass tube line
113, 113', 113", 113', 113"" Forming device
115, 115', 115", 115', 115"" Cooling device
117a, 117a', 117a", 117a''', 117a"" Contacting device
117b, 117b', 117b", 117b', 117b"" Contacting device
117c, 117c', 117c", 117c''', 117c"" Contacting device
117d, 117d', 117d", 117d', 117d"" Contacting device
117e', 117e", 117e''', 117e"" Contacting device
117f', 117f"" Contacting device
119a, 119a', 119a", 119a''', 119a"" Contacting device
119b, 119b', 119b", 119b', 119b"" Contacting device
119c, 119c', 119c", 119c''', 119c"" Contacting device
119d, 119d', 119d", 119d', 119d"" Contacting device
119e', 119e", 119e''', 119e"" Contacting device
121a, 121b Contacting area
123, 123', 123", 123', 123"" Transport device
P1, P1', P1", P1''', P1"" Position
P2, P2', P2", P2''', P2"" Position
P3, P3', P3", P3''', P3"" Position
P4, P4', P4", P4''', P4"" Position
P5, P5', P5", P5''', P5"" Position
P6, P6', P6", P6''', P6"" Position
P7, P7', P7", P7''', P7"" Position
P8, P8', P8", P8''', P8"" Position
P9', P9", P9''', P9"" Position
P10', P10", P10''', P10"" Position
P11''', P11"" Position
d Distance
e Distance
t Distance
x, x', x", x''', x"" Axis
D Distance
R Direction
T Thickness

What is claimed is:
1. A glass tube element, comprising:
hollow cylindrical section that has a shell enclosing a lumen, the shell having an outer diameter in a specific cross-sectional plane that is perpendicular to a main extension of the glass tube element;
a first ratio of a difference value to a mean value, the difference value being a difference of a minimal value and a maximal value of the outer diameter, the mean value being mean of the minimal value and the maximal value;

a sub-section having a start, an end, and a distance of 1 meter measured along a straight line from the start to the end and intersecting with a center axis of the sub-section at the start and the end, the sub-section having, for every point of the center axis, a shortest distance to the straight line; a second ratio of a specific distance to 1 meter, the specific distance being defined as a largest of all shortest distances; and a product of the first and second ratio smaller than $4 \times 10^{-6}$.

2. The glass tube element of claim 1, wherein the first ratio is smaller than 0.005.

3. The glass tube element of claim 1, wherein the first ratio is smaller than 0.001.

4. The glass tube element of claim 1, wherein the second ratio is smaller than 0.00075.

5. The glass tube element of claim 1, wherein the second ratio is smaller than 0.0002.

6. The glass tube element of claim 1, wherein the product is smaller than $3.5 \times 10^{-6}$.

7. The glass tube element of claim 1, wherein the product is smaller than $3 \times 10^{-6}$.

8. The glass tube element of claim 1, wherein the product is smaller than $2 \times 10^{-6}$.

9. The glass tube element of claim 1, wherein the product is smaller than $1 \times 10^{-6}$.

10. The glass tube element of claim 1, wherein the product is smaller than $0.5 \times 10^{-6}$.

11. The glass tube element of claim 1, wherein the glass tube element has a length of between 0.5 and 5 m.

12. The glass tube element of claim 1, wherein the maximal value of the outer diameter is between 1 and 100 mm.

13. The glass tube element of claim 1, wherein the shell has an average thickness of between 0.1 and 5 mm.

14. The glass tube element of claim 1, comprising a glass selected from a group consisting of silicate glass, soda line, alumosilicate glass, borosilicate glass, and any combinations thereof.

15. The glass tube element of claim 1, comprising a glass with a transition temperature that is higher than 300 degrees C. and lower than 900 degrees C.

16. The glass tube element of claim 1, wherein the glass tube element connected to one or more further glass tube elements.

17. The glass tube element of claim 1, wherein the glass tube element is part of at least one glass tube line.

18. The glass tube element of claim 1, comprising a glass with an average linear coefficient of thermal expansion measured in the range of 20 degrees C. to 300 degrees C. (CTE) between 3.0 and $10.0 \times 10^{-6}$ $K^{-1}$.

19. The glass tube element of claim 1, wherein the glass tube element is configured as a pharmaceutical container selected from a group consisting of a vial, a cartridge, an ampoule, and a syringe.

* * * * *